United States Patent
Bickham et al.

(10) Patent No.: US 6,785,456 B2
(45) Date of Patent: Aug. 31, 2004

(54) DISPERSION MANAGED CABLE FOR UNREPEATERED SYSTEMS

(75) Inventors: Scott R. Bickham, Corning, NY (US); William D. Cornwell, Chester (GB); Nigel H. Taylor, Chester (GB); Thomas J. Atwood, Merrimack, NH (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/390,301

(22) Filed: Mar. 17, 2003

(65) Prior Publication Data

US 2003/0194191 A1 Oct. 16, 2003

Related U.S. Application Data

(60) Provisional application No. 60/372,185, filed on Apr. 12, 2002, now abandoned.

(51) Int. Cl.$^7$ ............................... G02B 6/16; G02B 6/28
(52) U.S. Cl. ........................................ 385/123; 385/24
(58) Field of Search ........................... 385/24, 123–127, 385/95–99

(56) References Cited

U.S. PATENT DOCUMENTS

| 6,157,754 | A | * | 12/2000 | Sasaoka et al. | ............... | 385/24 |
| 6,421,490 | B1 | * | 7/2002 | Liu | ............... | 385/127 |
| 2002/0181907 | A1 | * | 12/2002 | Bickham et al. | ............ | 385/123 |
| 2002/0191927 | A1 | * | 12/2002 | Liu | ............... | 385/123 |
| 2003/0039435 | A1 | * | 2/2003 | Srikant et al. | ............... | 385/24 |
| 2003/0063875 | A1 | * | 4/2003 | Bickham et al. | ............ | 385/98 |
| 2003/0147608 | A1 | * | 8/2003 | Abbott et al. | ............... | 385/123 |

FOREIGN PATENT DOCUMENTS

| EP | 0 883 002 A1 | 12/1998 | ............ | G02B/6/16 |
| EP | 1 030 200 A1 | 8/2000 | ............ | G02B/6/22 |

OTHER PUBLICATIONS

T. Miyakawa et al, "210 Gbit/s (10.7 Gbit/s×21 WDM) Transmission over 1200km with 200km Repeater Spacing for the Festoon Undersea Cable System", Optical Fiber Communication Conference, 2000, pp. 44–46, vol. 4, 2000.

* cited by examiner

Primary Examiner—John D. Lee
(74) Attorney, Agent, or Firm—Robert L. Carlson

(57) ABSTRACT

Optical fibers of different physical characteristics are combined to produce a hybrid fiber which, at the operating wavelength, has a relatively large effective area and desirable net dispersion and attenuation characteristics over the combined length of the hybrid system. Hybrid fibers are constructed in accordance with the principles of the invention by optically connecting a first fiber having a large effective area (greater than 85 $\mu m^2$), an attenuation less than 0.19 dB/km and a dispersion greater than 10 ps/nm/km at 1550 nm, to a second fiber having an effective area which is smaller than the first fiber, a dispersion which is less than 10 ps/nm/km, and an attenuation which is less than 0.23 dB/km at 1550 nm. Both the first and second fibers preferably have a positive dispersion slope at 1550 nm. The first and second fibers are preferably spliced directly together.

15 Claims, 2 Drawing Sheets

DISPERSION MANAGED CABLE FOR UNREPEATERED SYSTEMS

CROSS-REFERENCE TO RELATED APPLICATIONS

This application claims the benefit of priority under 35 U.S.C. §119 of U.S. Provisional Application Ser. No. 60/372,185 filed on Apr. 12, 2002 now abandoned.

BACKGROUND OF THE INVENTION

1. Field of the Invention

The present invention relates to an optical transmission line suitable for transmission and large capacity transmission of signal light and, more particularly, to hybrid optical fibers.

2. Technical Background

Submarine optical fiber cable systems, i.e. those which travel under water, typically between continents and or along the coastline of continents, can be repeatered or unrepeatered. Repeatered submarine systems employ repeaters along their length. A repeater is a unit typically in the form of an enclosed box, which contains an amplifier to boost signal strength and an equalizer to correct distortion. Typically such repeaters are placed at intervals along the submarine cable to allow longer cables to be used. Conversely, unrepeatered systems are submarine cable systems which do not use repeaters. Unrepeatered systems typically do not extend further than about 500 kilometers, and in most instances are considerably shorter than 500 kilometers. Unrepeatered systems are very often used in festoon applications, wherein the submarine cable is displaced between a transmitter and receiver at different locations along a coastline, with the festoon fiber being deployed under water between the transmitter and receiver.

Unrepeatered systems are playing a valuable role in linking markets, particularly those separated by distances of 100 to 500 km. One type of these systems, classified as festoon, is comprised of undersea networks which are used connect islands (in Malaysia, for example) as well as to circumvent unstable geological or political routes (in Africa and South America, for example). Several unrepeatered systems have also been installed in Northern Europe and across the English Channel, as well as on long overland routes that do not require add/drop capabilities but could use branching units. These applications are viewed as rapidly growing by most market analysts because they offer an affordable method of transmitting optical signals over several hundred kilometers.

The most commonly used fiber in unrepeatered systems is conventional single mode fiber, due its combination of low attenuation, large effective area, low price and wide availability. Such standard singlemode fiber may be comprised of a germania doped silica fiber, such as Corning SMF-28™ fiber, or pure silica core fiber. More recently, large effective area cutoff-shifted fibers such as Corning Vascade® L1000 have become available, which offer significantly larger effective areas (about 95–105 sq $\mu$m at 1550 nm) than standard single mode, and a cabled cutoff wavelength above the 1310 nm window. For comparison, the cutoff and effective area of standard single mode fiber are <1260 nm and about 80 sq. microns, respectively. Attenuation values of 0.194 dB/km and 0.186 dB/km have been reported for standard singlemode and cutoff-shifted fibers, respectively.

Fiber attenuation is a key attribute in the design of an unrepeatered system, as losses between approximately 20 and 60 dB are incurred when span lengths of 100–300 km are employed for a fiber having an attenuation of 0.20 dB/km, for example. Signal to noise constraints generally constrain system lengths to less than about 220 km when the sole source of amplification is an EDFA at the transmitter. The addition of distributed Raman amplification may increase the maximum length by 50 to 100 km. The Raman pump lasers are usually backward-propagating from the receiver end. Distances of 350–500 km can be achieved through the use of one or more Remote Optically Pumped Amplifiers (ROPAs), which consist of a length of Erbium-doped fiber which is spliced into the transmission path and pumped using the same fiber or an additional length of fiber that is optically coupled to the transmission fiber near the Erbium-doped section.

A second key attribute in the design of unrepeatered systems is effective area. The need to increase the channel count per fiber requires higher power handling capacity. The approximately 80 sq. micron effective area of standard single mode fiber offers acceptable performance up to distances of approximately 200 km and channel spacings of 50 GHz (0.8 nm) or higher. Increasing the distance requires higher input powers, which in turn increases nonlinearities such as self-phase-modulation (SPM). Decreasing the channel spacing results in increased penalties from inter-channel effects such as cross-phase modulation (XPM) and four-wave-mixing (FWM) if there is not a concomitant increase in the fiber effective area. It is therefore difficult to increase the product of capacity times distance in systems employing only standard single mode fiber. However, increasing the effective area of standard single mode from about 80 to about 101 sq. microns (typical of Corning Vascade® L1000) allows a (101-80)/80=25%=1 dB increase in the input power without an increase in fiber nonlinearities.

Standard single mode fibers have inherently high dispersion (>17 ps/nm/km) which must be compensated for at the terminals. A typical DCM-100™ dispersion compensation module, for example, compensates for up to 1700 ps/nm of dispersion and has a loss of about 10 dB. Thus, a 250 km link, which requires about 4,250 ps/nm of dispersion compensation at 1550 nm, will require at least two such modules placed between amplifiers to overcome the loss. This adds considerably to the complexity and cost of the terminal equipment. It is therefore desirable to reduce the average dispersion of the transmission link.

It is also desirable to maintain low attenuation in the transmission line, as the deterioration in the Optical Signal to Noise Ratio (OSNR) associated with increased attenuation is the dominant signal degradation mechanism in unrepeatered transmission systems.

SUMMARY OF THE INVENTION

Optical fibers of different physical characteristics are combined to produce a hybrid fiber which, at the operating wavelength, has a relatively large effective area and desirable net dispersion and attenuation characteristics over the combined length of the hybrid system. Hybrid fibers are constructed in accordance with the principles of the invention by optically connecting a first fiber having a large effective area (greater than 85 $\mu m^2$), an attenuation less than 0.19 dB/km and a dispersion greater than 10 ps/nm/km at 1550 nm, to a second fiber having an effective area which is smaller than the first fiber, a dispersion which is less than 10 ps/nm/km, and an attenuation which is less than 0.23 dB/km at 1550 nm. Both the first and second fibers preferably have a positive dispersion slope at 1550 nm. The first and second fibers are preferably spliced directly together.

The hybrid optical fiber may be employed in a telecommunications system. In a preferred embodiment of the invention, the segment of the hybrid fiber that has the largest effective area is positioned nearer to the transmitter end of the system. Placement of the segment of fiber with the largest effective area at the transmitter end of the hybrid fiber span ensures that the optical power density is reduced where the signal is most intense because the optical mode of the signal is spread over a larger effective area. This, in turn, minimizes the undesirable nonlinear effects in the fiber. The lengths of the first and second fibers are selected so that the average attenuation of the span is less than 0.2 dB/km at 1550 nm. The lengths and dispersion characteristics of the first and second fibers are also selected preferably to result in an average dispersion, over the length of the fiber span, which is less than 10 ps/nm/km at 1550 nm.

If the total dispersion of the transmission line can be reduced, then the equipment associated with dispersion compensation (e.g. DC modules) and associated amplifiers can also be reduced. The low dispersion hybrid fiber solutions disclosed herein offer significant reduction in terminal component count and hence system cost, which has been one of the major advantages of the use of NZDSF fibers in terrestrial networks.

Additional features and advantages of various embodiments of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE INVENTION

Figure 1:
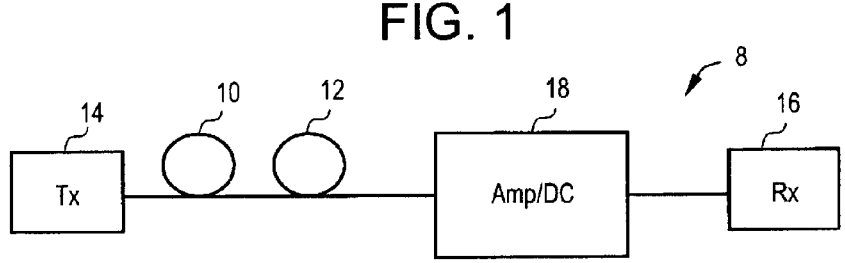
FIG. 1 is an optical communication system employing a hybrid fiber in accordance with the present invention.

Reference will now be made in detail to the present preferred embodiments of the invention, examples of which are illustrated in the accompanying drawings. Whenever possible, the same reference numerals will be used throughout the drawings to refer to the same or like parts. The present invention provides a method for combining segments of commercially-available optical fibers to produce a hybrid optical fiber having desired physical characteristics. More particularly, a first type of optical fiber comprised of positive dispersion, a large effective and relatively high (e.g. greater than 10 ps/nm/km) dispersion at 1550 nm and positive dispersion slope may be spliced with a second type of fiber having lower dispersion and positive dispersion slope at 1550 nm, to produce a hybrid fiber span having an increased effective area, a relatively low net fiber dispersion, and low attenuation.

The first fiber is a positive dispersion fiber having positive dispersion slope, high effective area (e.g. greater than about 80 $\mu m^2$), and relatively low loss (less than 0.20 dB/km) at 1550 nm. The first fiber also has a relatively large dispersion (e.g. greater than 10 ps/nm/km) at 1550 nm. The effective area of the first fiber is greater than 75 $\mu m^2$, more preferably greater than about 80 $\mu m^2$, and most preferably greater than about 85 $\mu m^2$. The first fiber exhibits an attenuation at 1550 which is less than 0.2, more preferably less than 0.195, and most preferably less than 0.190 dB/km at 1550 nm. The first fiber also exhibits a dispersion slope which preferably is less than 0.09, more preferably less than 0.08, and most preferably less than 0.07 ps/nm$^2$-km. The cable cutoff wavelength of the first fiber is preferably less than 1480 nm. The first fiber also preferably exhibits attenuation at 1383 nm which is less than 0.5 dB/km, more preferably less than 0.44 dB/km, and most preferably less than 0.38 dB/km. One such fiber which is commercially available is Corning's Vascade® L1000. The effective area and attenuation of this high effective area fiber are preferably greater than 90 sq. microns and less than 0.190 dB/km, respectively.

The second type of fiber is a lower dispersion fiber preferably having a dispersion below 10 ps/nm/km at 1550 nm. More preferably, the dispersion of the second type of fiber is less than 5 ps/nm/km and more preferably is negative at 1550 nm. The second fiber also preferably exhibits less than 0.23 dB/km, more preferably less than 0.22 dB/km, and most preferably less than 0.21 dB/km at 1550 nm. The second fiber also preferably exhibits attenuation at 1383 nm which is preferably less than 0.5 dB/km, more preferably less than 0.44 dB/km, most preferably less than 0.38 dB/km. More preferably, the second type of fiber exhibits 1550 dispersion which is less than −2 ps/nm/km and even more preferably less than −5 ps/nm/km. The cable cutoff wavelength of the second fiber is preferably less than 1480 nm. While a variety of fibers can be utilized as the second fiber type, two preferred fiber types are SMF-LS+™, and Metrocor™ fiber, both of which are manufactured by Corning Incorporated and are discussed further hereinbelow.

An example of a telecommunications system 8 employing a hybrid fiber span in accordance with the invention is illustrated in FIG. 1. In FIG. 1, the first length of a first optical fiber 10 comprising, at 1550 nm positive dispersion greater than 10 ps/nm/km, an effective area greater than 85 $\mu m^2$, and an attenuation less than 0.19 dB/km is optically connected to a first length of a second optical fiber 12 comprising, at 1550 nm, dispersion which is less than 10 ps/nm/km, an effective area less than that of the first fiber but greater than 25 $\mu m^2$, and an attenuation less than or equal to 0.23 dB/km. The first fiber 10 and second fiber 12 are disposed between a transmitter 14, which is capable of transmitting telecommunications signals or information, and a receiver 16 which is capable of receiving telecommunications signals or information. Because first fiber 10 has a larger effective area than second fiber 12, first fiber 10 is preferably optically coupled nearer to the transmitter end of the system 8. Also disclosed in the embodiment illustrated in FIG. 1 is amplifier 18 which is comprised of one or more amplifying fibers 20, as well as one or more dispersion compensating fiber 22, if needed. The amplifier 18 is preferably housed in a protective container. While the embodiment illustrated in FIG. 1 could be employed in any telecommunications system, this embodiment is particularly well suited for use in submarine telecommunication systems, more particularly in festoon submarine telecommunication systems. In festoon submarine systems, the fiber span which is comprised of fibers 10 and 12 would be located under water, and the transmitter, receiver, and amplifiers are all located on land, above water.

Figure 2:
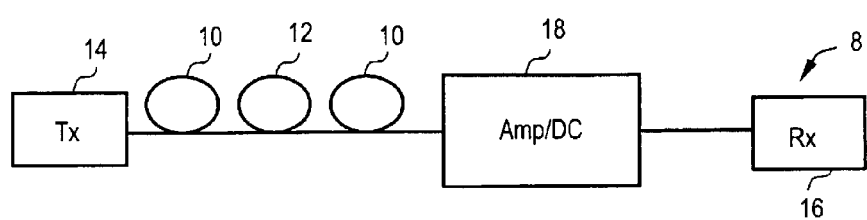
FIG. 2 is an optical communication system employing a hybrid fiber in accordance with the present invention.

An alternative embodiment of the present invention is illustrated in FIG. 2. FIG. 2 is identical to FIG. 1 with the exception that a second length of first fiber 10 is inserted between the length of second fiber 12 and the receiver. This configuration is particularly suited to distributed Raman-assisted transmission because it places the second fiber type, which has lower effective area, at a farther distance from the high power Raman-pump lasers. This reduces Double Rayleigh Back-Scattering levels and improves the effective noise figure of the Raman amplifier.

The higher effective area is usually only required at the transmitter. For typical input power levels of about 10–18 dBm/channel and an attenuation of 0.19 dB/km, the power is below 3 dBm/channel after approximately 40–80 km, and this is below the threshold for nonlinear impairments. Signal propagation at these power levels and lower is classified as quasilinear. Insertion of a second fiber type with a smaller effective area after this high power interval is then possible without introducing significant nonlinear penalties. In one embodiment of this invention, a high effective area fiber is also used at the receiver.

The negative dispersion fiber is preferably a non-zero dispersion shifted fiber such as Corning Sub-LS+® or Corning Metrocor® fiber, both of which have an effective area in the 45–55 sq. micron range.

Without Raman-pumping, the preferred location of the second, lower dispersion fiber is always at the end of the span, but with Raman pumping, the second, lower dispersion fiber is preferably sandwiched between two sections of the first, larger effective area fiber to improve power coupling into the transmission fiber.

The total chromatic dispersion of the first and second fibers is preferably selected so that the average loss of the resultant hybrid span is less than or equal to 0.2 dB/km at 1050 nm, more preferably less than about 0.195 dB/km. Having a lower hybrid span attenuation will cause a reduction in the optical signal to noise ratio (OSNR) due to fiber loss. For example, negative dispersion fibers such as Corning Metrocor® and Sub-LS+® fibers with losses of approximately 0.20 dB/km may comprise as much as 50% of the span when combined with Corning Vascade™ L1000.

Table 1 gives the attributes at 1550 nm of four samples of Corning SMF-28™, Corning Vascade®L1000, Corning Sub-LS+® and Corning Metrocor® fibers, each of which are labeled as fibers 1, 2, 3, and 4, respectively. Set forth in Table 2 are three hybrid spans in accordance with the present invention, and two single fiber spans. The data in Table 2 illustrates that the OSNR of the fiber 1 and hybrid span is approximately the same when a 1:1 length ratio is employed, but the OSNR is more than 3 dB lower than that of fiber 1 when a 1:4 length ratio is employed (length of the first fiber type to length of the second fiber type). Consequently, in the present invention, the ratio of the lengths of the first fiber to the second fiber is preferably at least 1:3 or greater, more preferably 1:2 or greater, and most preferably about 1:1. The average dispersion and attenuation of a hybrid span comprised of a 1:1 ratio of fiber 2 and fiber 3 are 8.25 ps/nm-km and 0.192 dB/km. The average dispersion and attenuation of a hybrid span comprised of a 1:1 ratio of fiber 2 and fiber 4 are 6 ps/nm-km and 0.193 dB/km.

TABLE 1

|  | Fiber 1 | Fiber 2 | Fiber 3 | Fiber 4 |
|---|---|---|---|---|
| Dispersion (ps/nm-km) | 17.0 | 19.0 | −2.5 | −7.0 |
| Attenuation (dB/km) | 0.190 | 0.183 | 0.203 | 0.205 |
| Effective Area ($\mu m2$) | 80 | 101 | 55 | 55 |

TABLE 2

|  | Length (km) | Loss (dB) | Avg. Atten. (dB/km) | Avg. Disp. (ps/nm-km) | Power (dBm) | OSNR (dBm) |
|---|---|---|---|---|---|---|
| F1 | 251.5 | 47.8 | 0.190 | 17 | 27 | 17.2 |
| F2 | 249 | 45.5 | 0.183 | 19 | 28 | 20.2 |
| Fibers 2 and 3 (1:1) | 250.7 | 48.1 | 0.192 | 8.25 | 28 | 18.2 |
| Fibers 2 and 3 (1:4) | 255 | 51.6 | 0.202 | 1.8 | 28 | 14.1 |
| Fibers 2 and 4 (1:1) | 250.3 | 48.3 | 0.193 | 6 | 28 | 17.5 |

The amount of power employed in the experiments illustrated in Table 1 was optimized for best performance. Because SMF-28 has a smaller effective area than any of the positive dispersion fibers employed in each of the other four columns, the amount of power than could be employed with fiber 1 was slightly less (27 dBm) than was employed with the fiber 2 or the three hybrid spans (28 dBm). This illustrates the advantage of several of the embodiments of the present invention which utilize a large effective area fiber as the positive dispersion fiber and the hybrid fiber span. Namely, because fiber 2 has the larger effective area, more power can be employed at the transmitter end. The benefit to this is that the more power that can be implied at the transmitter end, and this increases the maximum OSNR that can be achieved in the transmission link.

EXAMPLE

In order to assess the advantage and trade-offs between the hybrid fibers of the present invention and two single fiber solutions, four different fiber scenarios were tested:

F1—approximately 250 km of Corning SMF-28™ fiber.

F2—approximately 250 km of Corning Vascade™ L1000 fiber.

Hybrid 1—approximately 125 km of Corning Vascade™ L1000 fiber followed by approximately 125 km of Corning Submarine-SMF-LS™+ fiber.

Hybrid 2—approximately 125 km of Corning Vascade™ L1000 fiber followed by approximately 125 km Corning MetroCor™ fiber.

The overall transmission line characteristics are summarized in Table 3. F2 has the lowest loss while that for the other three fiber spans are broadly similar. The overall line dispersion for the two hybrid options is reduced by more than 50% compared to the single fiber options.

TABLE 3

| | Pre-comp (ps/nm) | Post-Compensation | Post-Comp. (ps/nm) | Link Disp. (ps/nm) | Total Disp. (ps/nm) |
|---|---|---|---|---|---|
| F1 | −170 | DCM-95 + DCM-95 +0 DCM-40 | −3910 | 4250 | 170 |
| F2 | −170 | DCM-95 + DCM-60 + DCM-100 | −4335 | 4675 | 170 |
| Hybrid 1 | −170 | DCM-95 | −1615 | 2025 | 240 |
| Hybrid 2 | −170 | DCM-60 | −1020 | 1463 | 273 |

Figure 3:
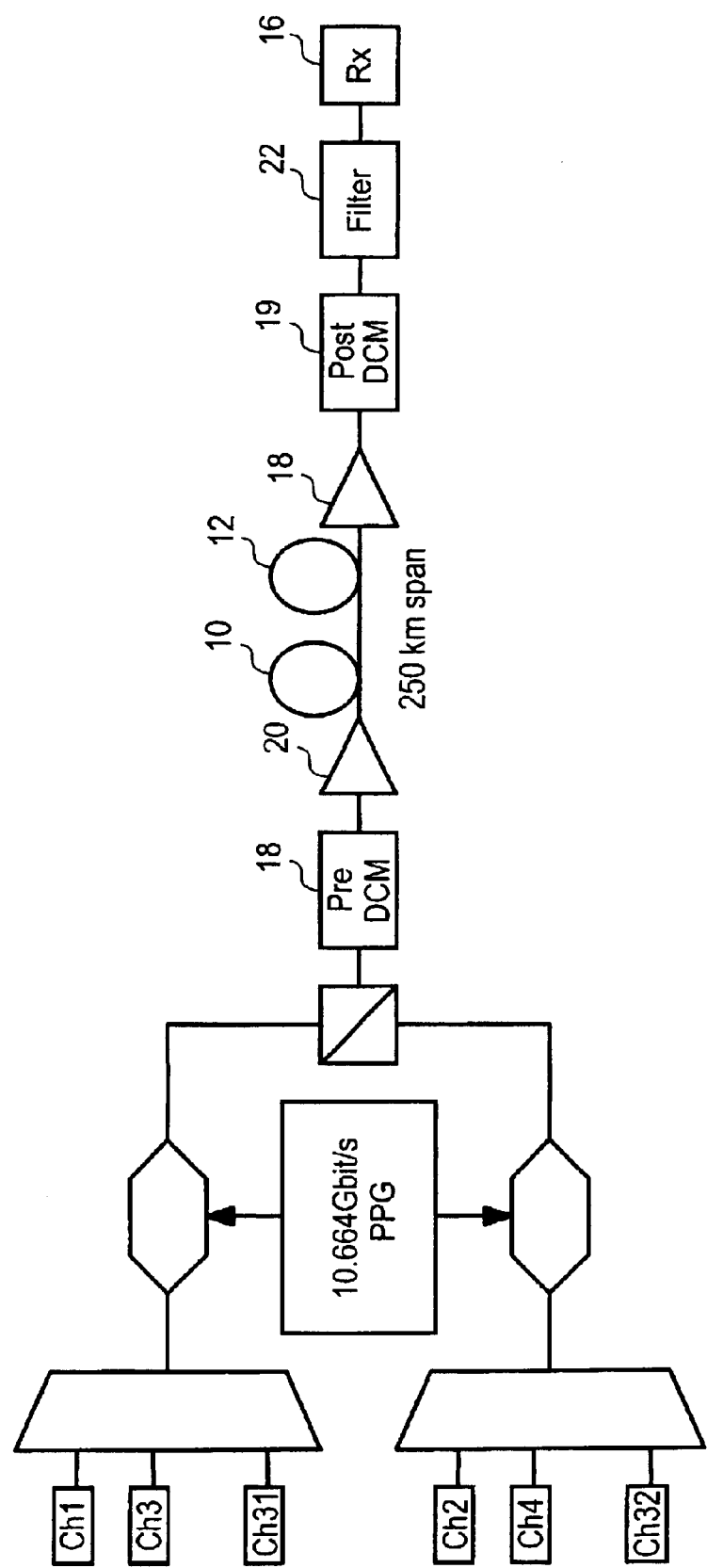
FIG. 3 is an optical communication system employing a hybrid fiber in accordance with the present invention.

FIG. 3 shows the experimental set up used to test the various fiber types. In FIG. 3, WDM transmitter 14 transmits a signal through a pre-compensating dispersion compensating module 18. The transmitted signal then travels through pre-amplifier 20, a hybrid fiber span comprising fibers 10 and 12, and subsequent to traveling through the hybrid fiber span, the signal travels through another amplifier 18, a post transmission dispersion compensating module 19, a filter 22, and on to the receiver 16, where the signal is received. Preferably, if such a system as illustrated in FIG. 3 were employed in the festoon system, only the hybrid fiber span comprised of fibers 10 and 12 would be submerged under water, and the remainder of the optical fiber telecommunications system 8 would be disposed on land, above water. The 32 channel WDM sources were spaced at 50 GHz with alternate orthogonal polarization. They were modulated at 10.664 Gb/s by an unchirped Mach Zehnder modulator to produce NRZ pulses. The transmission rate included the 7% overhead for ITU G0.975 FEC although this was not implemented. The amount of pre and post dispersion compensation and the launch power were optimized to achieve the best overall system performance for each fiber under test. In all cases, the pre-compensation in the amount of −170 ps/nm was employed. The receiver comprised a low noise pre-amplifier and a 0.3 nm tuneable filter for channel selection.

Figure 4:
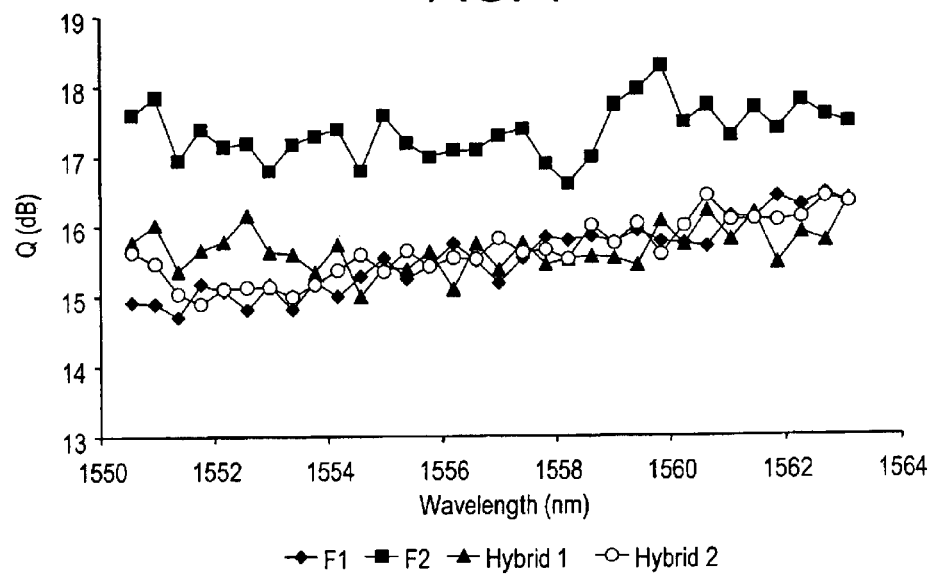
FIG. 4 illustrates system performance (Q) vs. wavelength for several hybrid fiber spans in accordance with the invention.

The total launch power into F1 was +27 dBm. Because the first fiber for the other three cases has a larger effective area, +28 dBm was launched into F2, Hybrid 1 and Hybrid 2. System performance (Q) for all four fiber scenarios are plotted in FIG. 4. Hybrid 1, Hybrid 2, and F1 have similar performance while F2 has 2 dB better performance due to its large effective area and its low attenuation—both resulting in enhanced OSNR at the receiver.

The attenuation of the hybrid fiber cases are slightly higher than for F1. This is, however, compensated for by the 1 dB higher launch power used because the first fiber has a larger effective area. The lower effective areas of the second fiber in the two hybrid fiber cases does not impose any significant limitations on the launch power. This is because the power reaching them is not high enough to cause the onset of any non-linear effects.

Hybrid 1 and Hybrid 2 offer the advantage of 57% and 69% lower terminal dispersion compensation respectively, compared to the lowest attenuation fiber case (F2). The trade-off for this reduced terminal complexity is a small 2 dB lower Q due to the higher fiber attenuation of the negative dispersion fibers. While this is not acceptable on systems at the performance limit of the transmission equipment for other systems, it could result in overall cost savings.

The hybrid fiber concept can be extended to systems using Raman amplification. Here the lower effective area of the negative dispersion part of hybrid solutions also provides better Raman efficiency.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A hybrid optical fiber span, comprising:
   a first length of a first optical fiber comprising, at 1550 nm, positive dispersion greater than 10 ps/nm/km, an effective area greater than 85 $\mu m^2$, and an attenuation less than 0.20 dB/km;
   and first length of a second optical fiber comprising, at 1550 nm, dispersion which is less than 10 ps/nm/km, an effective area less than that of the first fiber but greater than 25 $\mu m^2$, and an attenuation less than or equal to 0.23 dB/km;
   both of the first and second fibers exhibiting positive dispersion slope at 1550 nm;
   wherein the lengths of the first and second fibers are selected so that the average attenuation of the span is less than 0.2 dB/km at 1550 nm.

2. The hybrid fiber span of claim 1, wherein the lengths and dispersion characteristics of the first and second fibers are selected to result in an average dispersion, over the length of said fiber span, which is less than 10 ps/nm/km at 1550 nm.

3. The hybrid fiber span of claim 2, wherein the lengths of the first and second fibers are selected so that the average attenuation of the span is less than 0.195 dB/km at 1550 nm.

4. The hybrid fiber span of claim 1, wherein the lengths of the first and second fibers are selected so that the average attenuation of the span is less than 0.195 dB/km at 1550 nm.

5. The hybrid fiber span of claim 1, wherein said second fiber exhibits negative dispersion at 1550 nm.

6. The hybrid fiber span of claim 1, wherein said first fiber further exhibits a cable cutoff greater than about 1300 nm.

7. The hybrid fiber span of claim 1, wherein said first fiber further comprises an effective area at 1550 nm which is greater than about 90 square microns.

8. The hybrid fiber span of claim 1, wherein said second fiber further comprises an effective area at 1550 nm which is less than about 60 square microns.

9. The hybrid fiber span of claim 1, wherein the second fiber comprises an attenuation of less than 0.21 dB/km, and a length which comprises between 30 and 60 % of the total length of the span.

10. The hybrid fiber span of claim 1, wherein the second fiber comprises at less than 40 % of the total length of the span.

11. A transmission line comprising a hybrid fiber span in accordance with claim 1, further comprising a second length of said first fiber, said second fiber located between a Raman pump, on the one end, and said first length of said second fiber, on the other end.

12. A telecommunication system comprising a hybrid fiber span in accordance with claim 1 and a light source, said light source optically connected to said hybrid fiber.

13. A method of operating the telecommunication system of claim 12, further comprising a transmitter which transmits at a power which is equal to or greater than 10 dBm/channel.

14. The telecommunication system of claim 12, further comprising a receiver optically connected to said second fiber, and said telecommunication system operates without any additional dispersion compensation.

15. The telecommunication system of claim 12, wherein said telecommunication system is non-repeatered.

* * * * *